US005725720A

United States Patent [19]

Micaletti et al.

[11] Patent Number: 5,725,720

[45] Date of Patent: Mar. 10, 1998

[54] DETECTOR FOR ENVELOPES MADE OF PLASTIC, AND FLAT ARTICLE PROCESSING EQUIPMENT INCLUDING SUCH A DETECTOR

[75] Inventors: Gilbert Micaletti, Pomponne; Claude Mitte, Cormeilles, both of France

[73] Assignee: Alcatel Postal Automation Systems, Gentilly Cedex, France

[21] Appl. No.: 564,394

[22] Filed: Nov. 29, 1995

[30] Foreign Application Priority Data

Nov. 29, 1994 [FR] France .................................. 94 14295
Jul. 28, 1995 [FR] France .................................. 95 09230

[51] Int. Cl.$^6$ .................................................. B32B 31/00

[52] U.S. Cl. ......................... 156/364; 156/363; 156/378; 73/38; 73/866; 209/3.2; 209/591; 209/599; 209/699; 209/900

[58] Field of Search ......................... 73/38, 866; 209/3.2, 209/591, 599, 699, 900; 156/363, 364, 378

[56] References Cited

U.S. PATENT DOCUMENTS 3,035,695 5/1962 Buchwald et al. ...................... 209/643
3,199,673 8/1965 Flint .................................. 209/699 X
3,317,039 5/1967 Wadey .................................. 209/591
3,513,972 5/1970 Sakurai et al. ...................... 209/699 X
3,772,123 11/1973 Clark et al. ........................ 156/363 X
4,011,155 3/1977 Feurstein et al. .................. 156/363 X
4,670,081 6/1987 Takahashi et al. .................. 156/364 X
4,891,088 1/1990 Svyatsky ............................ 156/364 X
5,590,790 1/1997 Saunders ............................ 209/591 X

FOREIGN PATENT DOCUMENTS 475013 7/1951 Canada .................................. 209/591
0596720 3/1993 European Pat. Off. .
6071227 3/1994 Japan .................................... 209/591

*Primary Examiner*—David A. Simmons
*Assistant Examiner*—Paul Rivard
*Attorney, Agent, or Firm*—Sughrue, Mion, Zinn, Macpeak & Seas, PLLC

[57] ABSTRACT

The apparatus of the invention for discriminating mail in a paper envelope from mail in a plastics envelope makes use of a pneumatic technique. In particular, the apparatus comprises a pneumatic system suitable for deforming the envelope to be inspected by applying suction and for measuring variation in pressure associated with said deformation, whereby the inspected envelope is detected as being a paper envelope or as being a plastics envelope. This pneumatic detector may be associated with a detector operating by means of an optical effect for the purpose of controlling a labelling device in equipment for processing flat articles.

9 Claims, 4 Drawing Sheets

| OPTICAL DETECTION | PNEUMATIC DETECTION | LABEL |
|---|---|---|
| 1 | 1 | 1 |
| 1 | 0 | 1 |
| 0 | 1 | 1 |
| 0 | 0 | 0 |

DETECTOR FOR ENVELOPES MADE OF PLASTIC, AND FLAT ARTICLE PROCESSING EQUIPMENT INCLUDING SUCH A DETECTOR

The invention relates to an apparatus for discriminating between mail in a paper envelope and mail in a plastic envelope.

BACKGROUND OF THE INVENTION

Certain postal facilities require bar codes to be printed on the envelopes of mail items. However, the mail to be processed by sorting machines is packaged not only in paper envelopes, but frequently also in envelopes made of plastic materials (transparent or otherwise). A problem then arises in printing bar codes on such envelopes made of plastic since ink takes a long time to dry on such a medium and the printed bar codes are liable to be smudged out by the envelopes rubbing against parts of the sorting machine.

In order to avoid having to put labels carrying bar codes on all of the items processed by a postal sorting machine, proposals have been made to discriminate between envelopes made of plastic material and envelopes made of paper, so that labels are applied only to plastic envelopes.

The usual techniques for discriminating such envelopes are based on an optical effect whereby a light ray is reflected, and the energy reflected by the envelope being inspected is measured. Since plastics reflect more strongly than paper, discrimination is easy to perform. However, those techniques no longer give full satisfaction because of the increasing use of envelopes made of plastic materials that are colored or matt, which reflect light in a manner very similar to that of paper.

Thus, equipment for processing a wide spectrum of mail includes a labelling device that operates to put a label on every item processed, and that is extremely expensive.

OBJECTS AND SUMMARY OF THE INVENTION

The object of the invention is to remedy this drawback.

In particular, an object of the invention is to provide a device capable of operating on postal items travelling on a conveyor at a rate of about three items per second, and of discriminating, in real time, between items having envelopes of plastic material whether colored, matt, or transparent, and items having envelopes made of paper.

Another object of the invention is to propose such a discriminator device which is simple in structure, reliable, robust, and compact.

Yet another object of the invention is to propose such a discriminator device which is easy to integrate and maintain within a postal sorting machine.

According to the invention, apparatus for discriminating between mail in a paper envelope and mail in a plastic envelope comprises a pneumatic system suitable for deforming an envelope to be inspected by applying suction and for measuring a variation in pressure associated with the deformation, on the basis of which variation the inspected envelope is detected as being a paper envelope or as being a plastic envelope: in particular, the greater the deformation of the envelope, the greater the variation in pressure.

BRIEF DESCRIPTION OF THE DRAWINGS

Other characteristics and advantages appear from the following description of an embodiment of the invention.

MORE DETAILED DESCRIPTION

Figure 1:
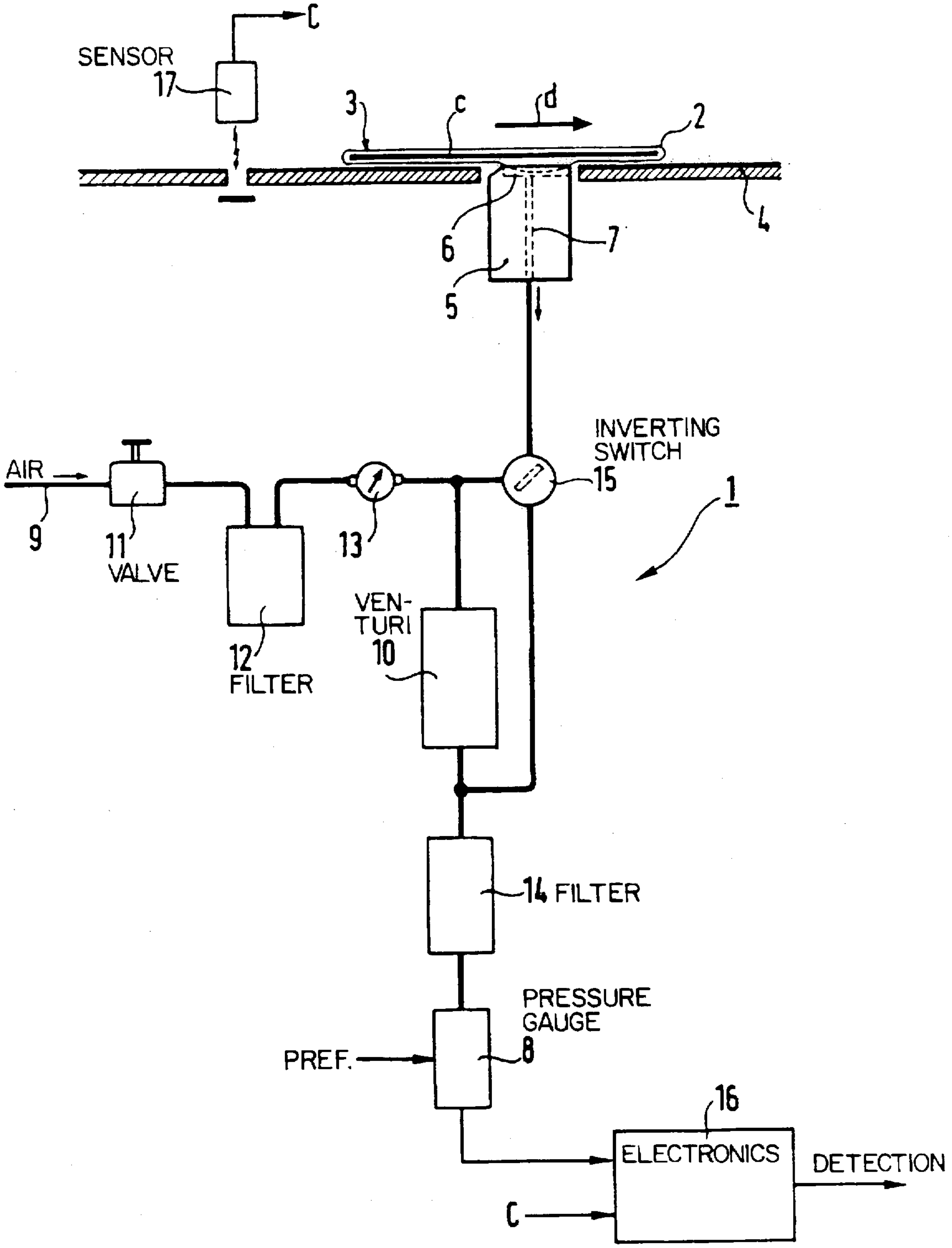
FIG. 1 is an overall block diagram of an apparatus of the invention.

In FIG. 1, the apparatus for discriminating between mail in a paper envelope and mail in a plastic envelope (referred to below as "paper items" and as "plastic items") mainly comprises a pneumatic system 1 which acts on each item to be inspected such as 2 so as to deform a portion of its envelope 3 and detect a pneumatic pressure magnitude representative of the stiffness of the envelope, on the basis of which the item 2 is detected as being a plastic item or a paper item. In this figure, item 2 contains mail c and it is travelling flat over a plate 4 in a conveyor direction represented by arrow d, the item 2 being conveyed, for example, by means of strips, presser rollers, or the like that are not shown in the figure.

The pneumatic system 1 comprises an air suction circuit connected to a nozzle 5 whose air inlet 6 opens out into the top face of the plate over which the item 2 moves so as to exert a suction force on that portion of the surface of the envelope of the item which covers the air inlet of the nozzle.

Figure 2:
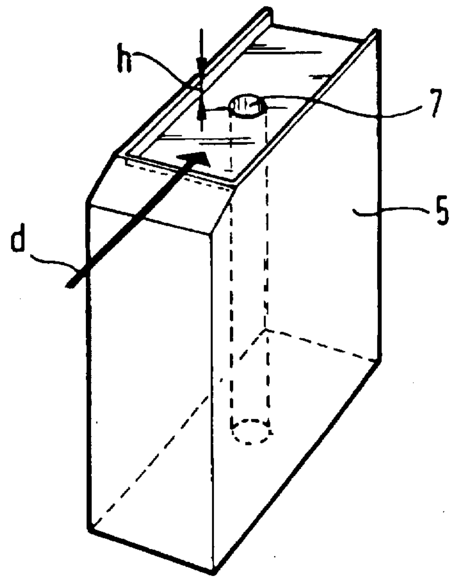
FIG. 2 is a perspective view of a suction nozzle forming part of the apparatus of the invention.

More particularly, the nozzle 5 is provided with a air inlet or cavity 6 which can be seen in FIG. 2 and which is substantially rectangular in shape, the bottom of the cavity opening to a channel 7 which passes through the nozzle 5 and which is connected to the suction circuit. The top of the cavity constitutes the air inlet of the nozzle and it is spaced apart from the bottom by a height h by flanks occupying three of the sides of the rectangle.

In particular, the nozzle 5 has a leading end relative to the direction d which is closed so as to reduce headlosses from the cavity, and a trailing end relative to said direction d which is open. Also, the leading end of the nozzle 5 is chamfered so as to facilitate displacement of the item 2 over the nozzle.

Returning to FIG. 1, when the face of item 2 in contact with the plate 4 covers the cavity 6 of the nozzle, a portion of the envelope 3 of the item is deformed by suction (portion shown in dashed lines) and closes the air inlet of the nozzle to a greater or lesser extent by reducing the volume of the cavity 6 depending on whether the envelope is made of plastic material or of paper. As a result, the pressure in the air suction circuit decreases and it is this pressure drop depending on the stiffness of the envelope that can be measured to detect the kind of item 2 (paper item or plastic item).

According to the invention, a suction pressure gauge 8 is connected to the outlet of the air suction circuit to measure this pressure variation and to issue information indicating either that a paper item has been detected or that a plastic item has been detected. Typically, it may be constituted by a pneumatic sensor as sold by Copal under the reference PS4-102V-3, that is suitable for measuring absolute pressure, and that is also suitable for comparing the measured absolute pressure with an adjustable reference pressure PREF. If the measured pressure is smaller than the reference pressure, then a plastic item is detected, and otherwise a paper item is detected.

A paper envelope is generally stiffer, thicker, and rougher than a plastic envelope. As a result, a paper item gives rise to smaller variation in pressure in the air suction circuit than does a plastic item since its envelope deforms less than does the envelope of a plastic item.

It should be observed that the height h of the cavity needs to be matched to the envelope texture of the items, and that a height of about 3/10 of a millimeter for suction pressure at the outlet of the nozzle 5 of about 700 millibars turns out to be suitable for discriminating postal items with a success rate of about 90%.

It should also be observed that the envelope 3 of the item must be properly pressed against the air inlet of the nozzle 5 while the item 2 is being conveyed at a speed of about 3 meters per second, and such pressing may be obtained by means of a deflector, a presser roller, or the like, pressing the top face of the item down towards the plate 4 in the vicinity of the nozzle 5.

The air suction circuit comprises a compressed air feed 9 connected via a Venturi 10 to the nozzle 5 so as to create suction at the outlet of the nozzle. The air feed 9 is connected to the Venturi via a valve 11 that is left open to cause the nozzle 5 to operate continuously in suction, an air filter 12, and a highly accurate pressure regulator 13 having a pressure gauge for setting the inlet pressure of the Venturi to a level of about 0.7 bars, for example.

A second air filter 14 is connected between the outlet of the Venturi and the vacuum gauge 8 so as to avoid clogging the gauge.

A reversing switch 15 is provided to divert air under pressure from the regulator 13 directly to the nozzle 5 so as to make it blow air out, thus facilitating cleaning by removing the dust that may accumulate within the cavity 6 or the channel 7.

In a postal application, if the item is detected as being a plastic item, then an indexing label having bar codes printed thereon is applied to the face of the item in a determined zone thereof (generally in the middle of the bottom of the item).

If the item is detected as being a paper item, then the bar codes are printed directly on the envelope in the determined zone.

An electronic circuit 16 is provided for collecting the detection information delivered successively by the sensor 8 at various different positions of the item being inspected relative to the nozzle 5 and for comparing the result of such accumulation with a preestablished threshold value that is optionally adjustable in order to decide whether the item being inspected is a paper item or a plastic item.

More particularly, the electronics circuit 16 operates to read output from the sensor 8 when the determined zone of the item being checked is passing over the nozzle 5. By measuring at a plurality of points, measurement errors are reduced and the reliability of the apparatus of the invention is correspondingly increased.

Figure 3:
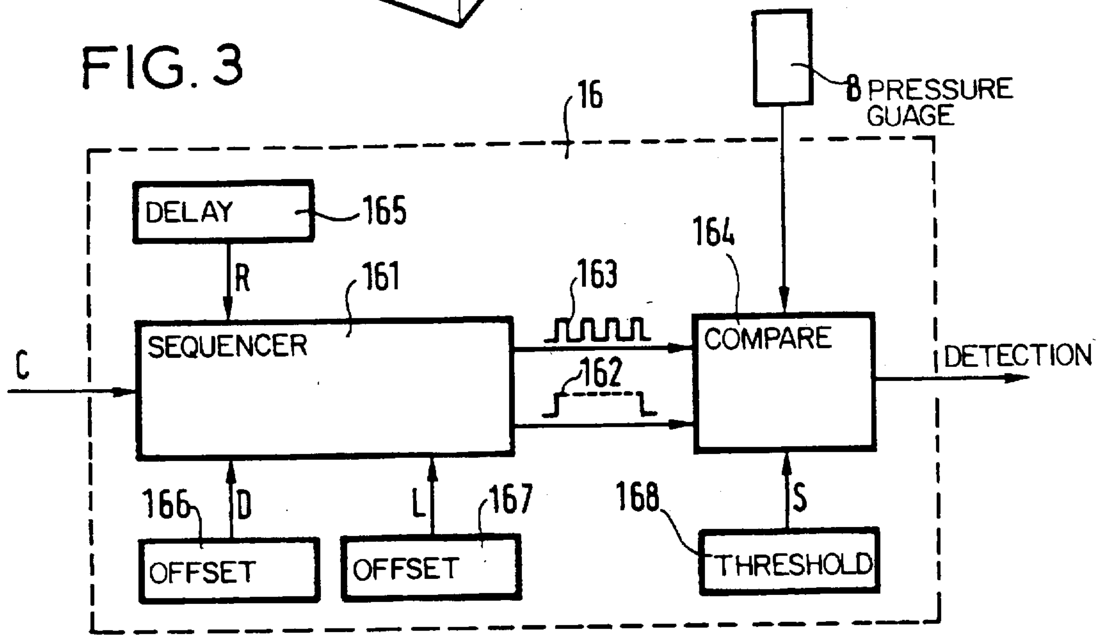
FIG. 3 is a block diagram of an electronic circuit forming part of the apparatus of the invention.

In FIGS. 1 and 3, a position sensor 17, e.g. an optoelectronic sensor, provides a signal C indicating that an item 2 has been detected upstream from the nozzle relative to the direction d.

The electronic circuit 16 includes a sequencer 161 which provides two clock signals 162 and 163 both beginning at an instant t0 defined as the instant from which the beginning of the determined zone on the item is facing the nozzle, i.e. the instant at which a first pressure measurement can be performed.

The sequencer 161 determines this instant t0 on the basis of the signal C and a preestablished and adjustable delay value R coming from a data input member 165, and a preestablished and adjustable offset value D coming from a data input member 166. The value of the delay R corresponds to the time required by the item 2 to move from the sensor 17 to the nozzle 5. The value of the offset D corresponds to the time required by the item 2 to move from a position where its leading edge overlies the nozzle 5 to a position where the beginning of the determined zone overlies the nozzle 5.

The clock signals stop at an instant t1 defined as the instant at which the end of the predetermined zone overlies the nozzle 5. The sequencer 161 determines this instant t1 on the basis of the instant t0 and a second offset value L that is preestablished and adjustable and that is made available on a data input member 167, this second value corresponding to the time required by the item 2 to move from the position in which the beginning of the determined zone overlies the nozzle 5 to a position in which the end of the determined zone overlies the nozzle 5.

In FIG. 3, the clock 163 has a plurality of transitions for a single transition of the clock 162: the clock 162 marks the beginning and the end of a sequence during which data from the output of the sensor 8 is accumulated, while the clock 163 marks the instants at which data from the output of the sensor 8 is acquired during the sequence.

It should be observed that data acquisition from the output of the sensor 8 takes place while the item 2 is moving over the plate 4. Tests have been performed in which about 100 data acquisitions are performed for each data accumulation sequence. The result of such accumulation is then compared in member 164 with a preestablished and adjustable threshold value S from a data input member 168, and a detection decision is taken on the basis of the comparison. For example, if the member 164 has accumulated 70 pieces of data indicating that a plastic item has been detected out of a total of 100 measurement points for that particular item, and if the threshold S is set to 60, then the member 164 decides that a plastic item has been detected. Naturally, the functions of the electronic circuit 16 may be implemented by a program without going beyond the ambit of the invention.

Figure 4:
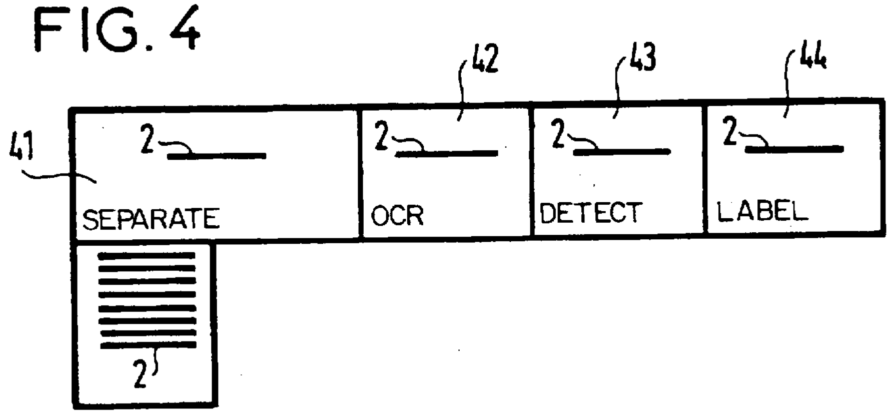
FIG. 4 shows a postal sorting machine incorporating the apparatus of the invention.

The apparatus of the invention is designed to be mounted in a postal sorting machine as shown in FIG. 4 and which comprises: an unstacker 41 for unstacking items such as 2 (paper items and plastic items) to separate the items so as to supply them serially; an optical character recognition system 42 suitable for reading the postal address characters on each item delivered by the unstacker; a discriminator 43 for distinguishing paper items and plastic items to provide data concerning the nature of the envelope of each item in association therewith; and a labelling device 44 for printing an index (bar code) or for placing an indexing label on each item as a function of the detection information provided by the discriminator 43, after which each item is directed to a carrousel for sorting postal items.

Consequently, when the discriminator 43 detects that the envelope of the inspected item is not made of plastic material, the labelling device 43 is caused to print an index directly on the envelope, i.e. it is caused to avoid putting a label on the envelope of the item in question.

It is common for the unstackers of postal sorting machines to include an installation for feeding compressed air. Consequently, the compressed air feed 9 required by the discriminator 43 of the invention may come directly from the unstacker 41, thereby providing a saving in outlay.

In addition, another discriminator operating on an optical basis may be associated with the discriminator 43 that operates on a pneumatic basis so as to further increase the successful detection rate of paper items and of plastics items.

Figures 5, 7:
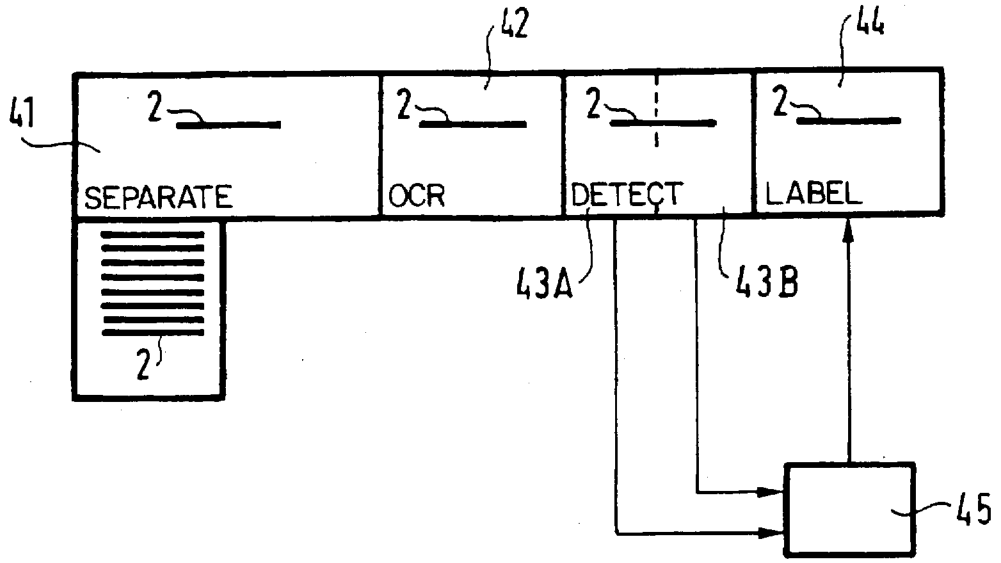
FIG. 5 shows a postal sorting machine fitted with the apparatus for discriminating between items of mail by an optical effect in association with an apparatus for discriminating between items by a pneumatic effect.
FIG. 7 is a truth table for operating a labelling device that forms part of the postal sorting machine of FIG. 5.

It should be observed that adding a detector that operates on an optical basis makes it possible to enlarge the spectrum of items processed by mail processing equipment, since the items may include items in paper envelopes with or without transparent windows, items in plastic envelopes, or other flat articles. More particularly, in FIG. 5, the flat article discriminator apparatus comprises a first discriminator 43A that operates optically and a second discriminator 43B that operates pneumatically (shown in greater detail in FIG. 6) both providing signals to a control unit, e.g., a microprocessor 45. On the basis of these signals, the control unit prevents or does not prevent a label being put on an inspected flat article in application of the truth table shown in FIG. 7. Thus, a label is not applied on a flat article (truth value 0 in the "LABEL" column in FIG. 7) when both detectors 43A and 43B do not detect the presence of plastic material (0 value signals in both the "OPTICAL DETECTION" and the "PNEUMATIC DETECTION" columns of FIG. 7), and the index is printed directly on the flat article under such circumstances. A label is put onto the flat article (logic value 1 in the "LABEL" column) whenever one or other or both of the detectors 43A and 43B detects the presence of plastic material (a 1 value in at least one of the "OPTICAL DETECTION" and "PNEUMATIC DETECTION" columns), in which case the index is printed on the label.

Figure 6:
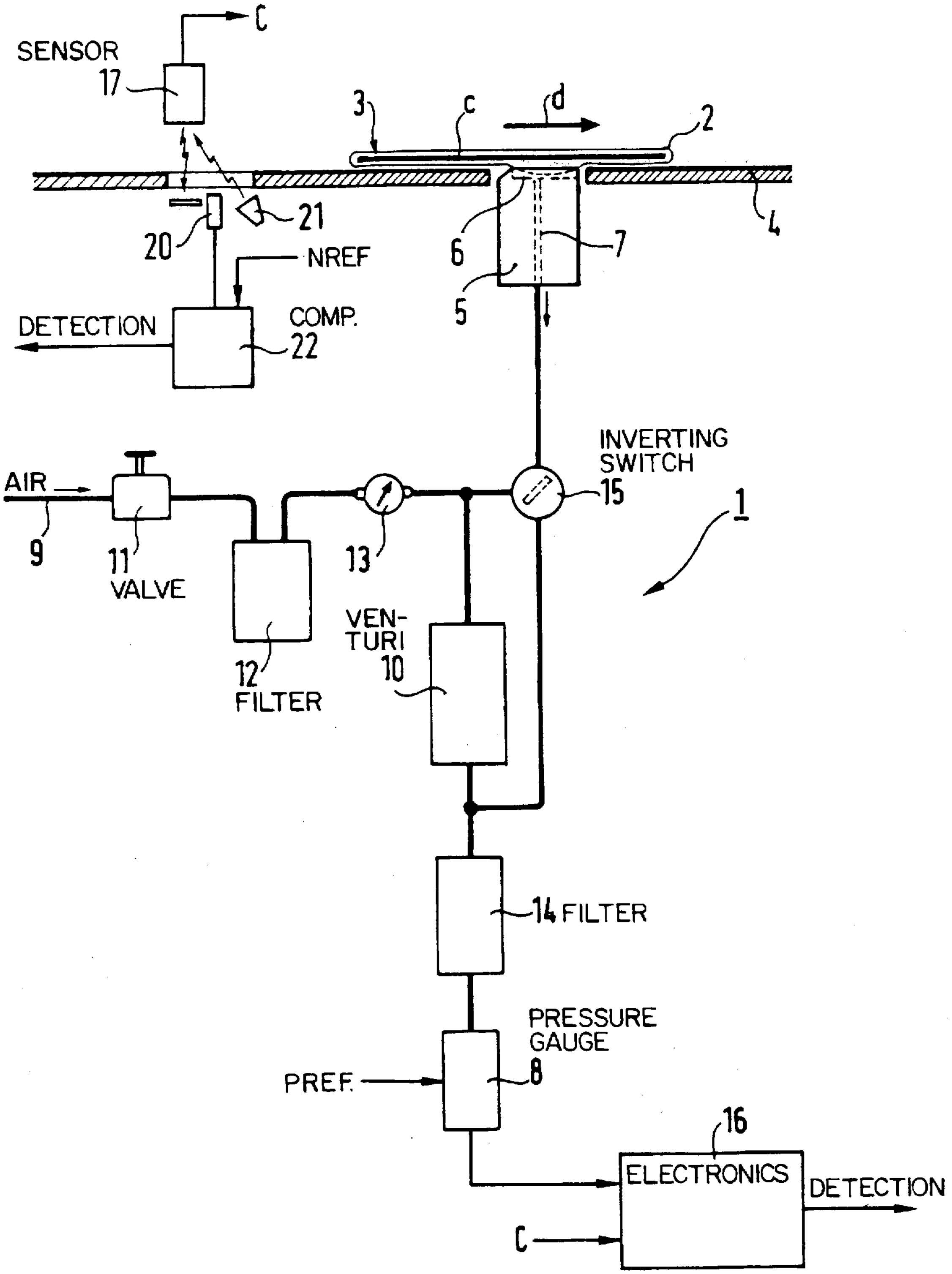
FIG. 6 shows in greater detail how the two discriminators of FIG. 5 are organized.

A conventional optical discriminator 43A is shown in FIG. 6. It comprises a strip of phototransistors 20 disposed transversely to the direction d beneath the plate 4 and operating with an incident illumination system 21. The electrical signals provided by the phototransistors are compared in a circuit 22 with a threshold value NREF whose level is adjusted to recognize the presence of plastic material. In particular, the presence of plastic material is checked by the discriminator 43A in the zone where the index is to be printed on the face of a flat article such as a paper envelope having a transparent window made of plastic material so as to cause a label to be applied to the face of said envelope when it so happens that the zone in which the index is to be printed coincides with the transparent window of the envelope.

Consequently, the above arrangement makes it possible to distinguish items in envelopes that are made entirely out of paper, from items in envelopes that are made out of paper but that have a transparent window of plastic material, items in envelopes made of plastic material, rigid plasticized items, etc. . . .

The above organization achieves a significant saving in the cost of running mail processing equipment that includes a labelling device so long as a large fraction of items are in all-paper envelopes, as compared with other types of item.

It should be observed that the pneumatic system 1 of the discriminator 43 or 43B (not including the nozzle 5) may advantageously be offset to the vicinity of the pneumatic equipment in the unstacker 41, thereby reducing the bulk of the sorting machine and simplifying maintenance thereof.

We claim:

1. An apparatus for discriminating between mail in a paper envelope and mail in a plastic envelope, comprising means for conveying said mail;

a pneumatic device for deforming a subject envelope to be inspected by applying suction to said subject envelope as said subject envelope is conveyed past said pneumatic device by said means for conveying said mail, and for outputting a pressure signal; and a controller for receiving said pressure signal and for measuring a variation in pressure resulting from deformation of said subject envelope, and for determining whether said subject envelope is a plastic envelope based on said variation in pressure.

2. The apparatus of claim 1, wherein said pneumatic device comprises:

a suction nozzle;

an air suction circuit, connected to said suction nozzle, mounted in a plate on which said subject envelope lies flat, said nozzle having an air inlet constituting a cavity arranged to be closed, at least in part, by said subject envelope; and a pressure sensor which measures pressure variation in said air suction circuit at the moment when said subject envelope closes said air inlet of said nozzle.

3. The apparatus of claim 2, wherein said air suction circuit comprises a compressed air feed that establishes outlet suction for said nozzle by means of a Venturi.

4. The apparatus of claim 3, wherein said compressed air feed is connected to the outlet of said nozzle via a reversing switch which makes said nozzle operate as a blow nozzle.

5. The apparatus of claim 2, wherein said pressure sensor is a vacuum gauge adjustable to a reference pressure value to deliver information indicative of one of a plastic material envelope detected and a paper envelope being detected.

6. The apparatus of claim 5, wherein said controller accumulates data output by said pressure sensor for various positions of said subject envelope relative to said nozzle and which compares an accumulation result with a preestablished threshold value to detect whether said subject envelope is a plastic envelope or a paper envelope.

7. Postal processing equipment comprising:

a labelling device for placing a label on a face of a postal article to be processed, said label serving as a medium on which an indexing code is printed;

means for conveying postal articles to be processed;

a pneumatic device for deforming a subject postal article by applying suction to said subject postal object, and for outputting a pressure signal; and a discriminator, coupled to said pneumatic device, for detecting whether said face of said postal article is plastic based upon said pressure signal, said labelling device applying said label to said postal article when said discriminator determines that said face of said postal article is plastic.

8. Postal equipment for processing postal articles comprising:

a labelling device for applying a label on a face of a postal article, said label serving as a medium on which an indexing code is printed;

a first optical discriminator for detecting whether said face of said postal article is made of plastic material;

a second pneumatic discriminator for detecting whether said face of said postal article is made of plastic material, said labelling device applying said label on said postal article when said first discriminator and said second discriminator detect that said face of said postal article is made of plastic material.

9. The postal equipment of claim 8, wherein said first optical discriminator is arranged to detect the presence of plastic material in an area of said face of said postal article where said indexing code is to be printed.

* * * * *